United States Patent
Mendelson et al.

(10) Patent No.: US 7,958,510 B2
(45) Date of Patent: Jun. 7, 2011

(54) DEVICE, SYSTEM AND METHOD OF MANAGING A RESOURCE REQUEST

(75) Inventors: Abraham Mendelson, Haifa (IL); Julius Mandelblat, Haifa (IL); Larisa Novakovsky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1493 days.

(21) Appl. No.: 11/321,643

(22) Filed: Dec. 30, 2005

(65) Prior Publication Data

US 2007/0157208 A1    Jul. 5, 2007

(51) Int. Cl.
*G06F 9/46* (2006.01)
*G06F 3/00* (2006.01)
*G06F 12/00* (2006.01)
*G06F 13/00* (2006.01)

(52) U.S. Cl. .......... 718/104; 718/100; 718/102; 710/39; 710/36; 710/200; 711/100; 711/111; 711/150; 711/151; 711/152

(58) Field of Classification Search ............. 718/1, 100, 718/101, 102, 103, 104, 105, 106, 107, 108; 710/22, 23, 36, 37, 39, 40, 200, 220, 240; 711/100–113, 150–152, 167–169
See application file for complete search history.

(56) References Cited

U.S. PATENT DOCUMENTS

| | | | | |
|---|---|---|---|---|
| 5,502,840 A | * | 3/1996 | Barton | 710/200 |
| 5,588,124 A | * | 12/1996 | Hongo | 710/107 |
| 6,105,051 A | * | 8/2000 | Borkenhagen et al. | 718/103 |
| 6,223,204 B1 | * | 4/2001 | Tucker | 718/103 |
| 6,748,593 B1 | * | 6/2004 | Brenner et al. | 718/105 |
| 6,944,736 B2 | * | 9/2005 | Wilson et al. | 711/167 |
| 6,965,961 B1 | * | 11/2005 | Scott | 710/310 |
| 6,981,260 B2 | * | 12/2005 | Brenner et al. | 718/103 |
| 7,051,026 B2 | * | 5/2006 | Berry et al. | 1/1 |
| 7,213,093 B2 | * | 5/2007 | Hammarlund et al. | 710/200 |
| 7,234,143 B2 | * | 6/2007 | Venkatasubramanian | 718/102 |
| 7,383,368 B2 | * | 6/2008 | Schopp | 710/200 |
| 7,657,681 B2 | * | 2/2010 | Tanaka | 710/240 |
| 2002/0107854 A1 | * | 8/2002 | Hua et al. | 707/8 |
| 2005/0080963 A1 | * | 4/2005 | Schopp | 710/200 |
| 2005/0081204 A1 | * | 4/2005 | Schopp | 718/100 |

* cited by examiner

*Primary Examiner* — Meng-Ai An
*Assistant Examiner* — Abdullah Al Kawsar
(74) *Attorney, Agent, or Firm* — Caven & Aghevli LLC

(57) ABSTRACT

Embodiments of the present invention provide a resource management mechanism to monitor the availability of resources, detect the cause of a rejection, distinguish between different types of rejections, and manage the different types accordingly. For example, a queue manager in accordance with embodiments of the invention may be able to classify rejected requests, for example, as either a "long reject" or a "short reject" based on the cause of the rejection and the amount of time the rejection conditions are expected to remain valid. A short reject request may be rescheduled in an appropriate service queue, while a long reject request may be suspended in a reject queue. Other features are described and claimed.

20 Claims, 3 Drawing Sheets

DEVICE, SYSTEM AND METHOD OF MANAGING A RESOURCE REQUEST

BACKGROUND OF THE INVENTION

Resource management within microprocessors or microprocessor systems may relate to, for example, managing access to memory, files, bus interfaces, and the like. In some prior art microprocessors or microprocessor systems, a request that cannot be served due to resource unavailability, resource contention and/or data consistency reasons may be rejected and reissued in a subsequent cycle. Moreover, the same request may be rejected and reissued repeatedly, e.g., many times. Such repeated reissuing and rejection of the request may result in wasted power, performance, or cache bandwidth.

Some existing resource management techniques, such as memory allocation by the operating system (OS) are overly time-consuming due to their complexity, and may not be feasible in an environment where resource management decisions need to be made in a limited, small number of cycles, or in the same cycle. For example, some prior art resource management techniques may not provide efficient management between different agents that need access to a common bus, locking mechanisms where the lock can be either open or taken, and the like.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
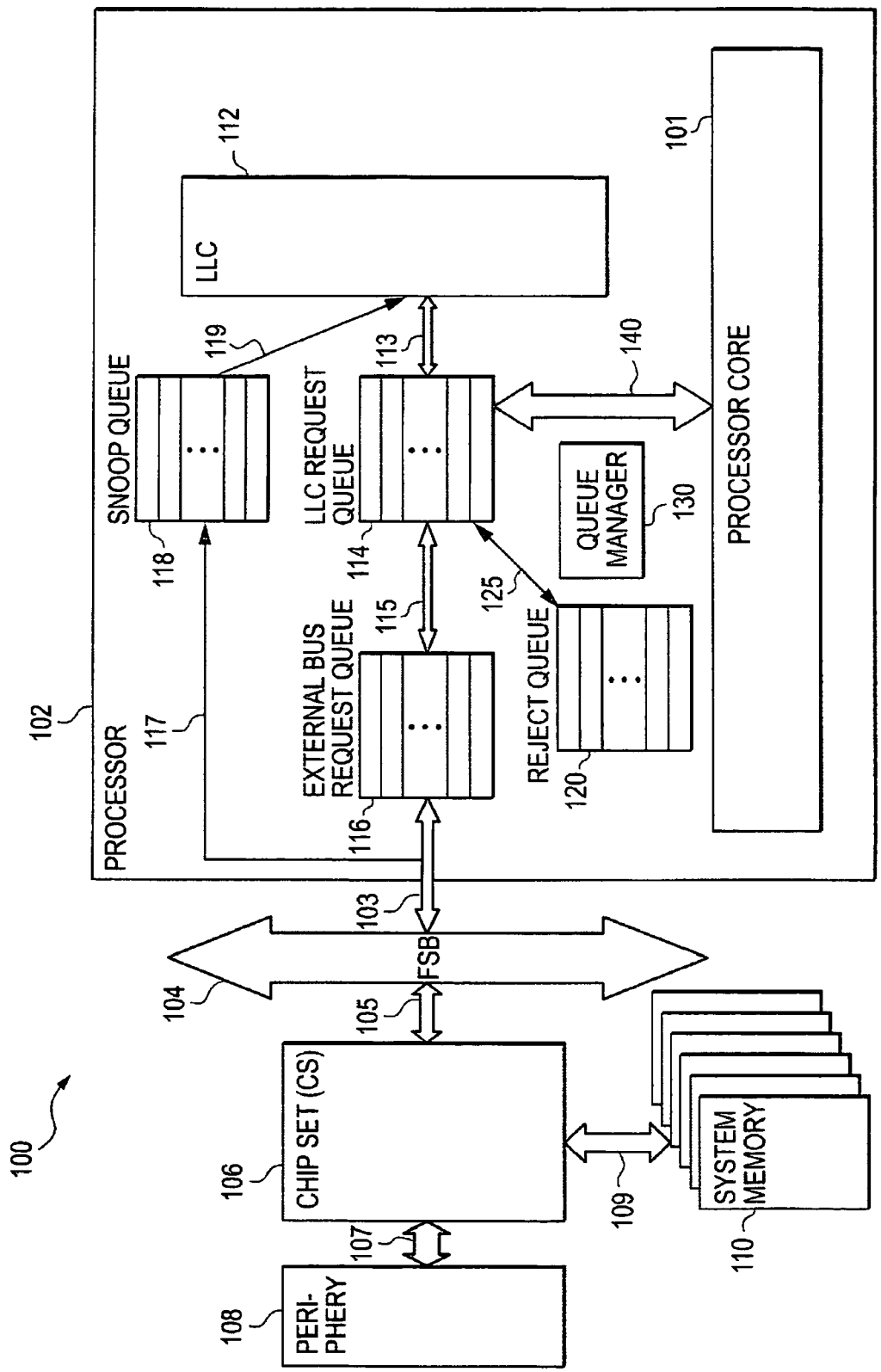
FIG. 1 is a schematic diagram of a shared-bus computing system in accordance with some demonstrative embodiments of the invention, including a processor in which at least one embodiment of the invention may be used.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of embodiments of the invention. However, it will be understood by those of ordinary skill in the art that embodiments of the invention may be practiced without these specific details. In other instances, well-known methods, procedures, components and circuits have not been described in detail so as not to obscure embodiments of the invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Reference is made to FIG. 1, which schematically illustrates part of a computing system 100 in accordance with some demonstrative embodiments of the invention. Although embodiments of the invention are not limited in this respect, system 100 may include or may be, for example, a personal computer, a desktop computer, a mobile computer, a laptop computer, a notebook computer, a terminal, a workstation, a server computer, a Personal Digital Assistant (PDA) device, a tablet computer, a network device, a microcontroller, a cellular phone, a camera, or any other suitable computing and/or communication device.

According to some demonstrative embodiments of the invention, system 100 may include one or more processors 102. Processor 102 may include, for example, a central processing unit (CPU), a digital signal processor (DSP), a microprocessor, a host processor, a plurality of processors, a controller, a chip, a microchip, or any other suitable multipurpose or specific processor or controller. Although embodiments of the invention are not limited in this respect, processor 102 may include or may be, by way of example only, a reduced instruction set computer (RISC), a processor that has a pipeline, a multi-core processor, a complex instruction set computer (CISC), and the like. In accordance with embodiments of the invention, processor 102 may include a processor core or cores 101, e.g., including one or more execution units, a retirement unit, a decoder, a fetcher, an optional scheduler, and the like, as are known in the art.

According to some demonstrative embodiments of the invention, system 100 may include a shared bus, such as a "front side bus" (FSB) 104. For example, FSB 104 may be a CPU data bus able to carry information between processor 102, e.g., a CPU, via an interconnect 103, and other devices of computing system 100. In accordance with embodiments of the invention, FSB 104 may connect between CPU 102 and a chipset 106, e.g., via an interconnect 105. Although the invention is not limited in this respect, chipset 106 may include one or more motherboard chips, e.g., a "northbridge" and a "southbridge", and/or a "firmware hub". Chipset 106 may include connection points for additional buses and/or devices of computing system 100.

According to some demonstrative embodiments of the invention, system 100 may include one or more peripheries 108 connected to chipset 106 via an interconnect 107. For example, periphery 108 may include an input unit, e.g., a keyboard, a mouse, a touch-pad, or other suitable pointing device or input device; an output unit, e.g., a cathode ray tube (CRT) monitor, a liquid crystal display (LCD) monitor, or other suitable monitor or display unit. In some embodiments the aforementioned output devices may be coupled to the chipset 106, such as in the case of a system containing a firmware hub. In some embodiments, the periphery may include a storage unit, e.g., a hard disk drive, a floppy disk drive, a compact disk (CD) drive, a CD-Recordable (CD-R) drive, or other suitable removable and/or fixed storage unit.

According to some demonstrative embodiments of the invention, system 100 may include a memory unit 110, e.g., a system memory connected to chipset 106 via an interconnect 109, e.g., a memory bus. Memory unit 110 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units.

According to some demonstrative embodiments of the invention, processor 102, e.g., a CPU, may include non-core elements. For example, CPU 102 may include a memory cache 112 and one or more service queues, e.g., queues 114, 116, 118, and 120, for management of resource access requests, as explained in detail below. For example, memory cache 112 may include or may be a last level cache (LLC) of a multi-level cache memory or memories having two or more levels. In some embodiments of the invention, LLC 112 may be external to CPU 102, for example, a level two (L2) or level three (L3) cache that may be accessed via a dedicated or shared bus. For example, queues 114-120 may comprise hardware buffers that store requests for service in a first-in-first-out (FIFO) order of service. In addition, one or more of queues 114-120 may be associated with one or more queue managers, e.g., queue manager 130, respectively, to schedule the order of service of the queue. System 100 may additionally include other suitable hardware components and/or software components.

In some embodiments, CPU core 101 may generate a request to access a resource, e.g., memory. For example, processor 102 may include a core interface 140 to communicate signals and/or data between processor core 101 and the non-core elements of processor 102, and the access request may be communicated via interface 140. Although embodiments of the invention are not limited in this respect, a request may include or may be a data read access, a data write access, or similar instruction to perform an operation. As is known in the art, the request may include one or more fields, e.g., to designate a request indication, request type, request address, and other attributes, such as memory type and the like. Under some circumstances, e.g., if the resource is exclusively locked by a previous request, the request to access a resource may be rejected. Although embodiments of the invention are not limited in this respect, a resource management technique in accordance with some demonstrative embodiments of the invention may be able to employ a heuristic approach to classify a resource access request, for example, as either a "long reject" or a "short reject" based on the cause of a potential rejection and the amount of time the requested resource is expected to remain locked, as explained in detail below.

According to some demonstrative embodiments of the invention, the access request may be allocated as an entry in a queue associated with the LLC 112, e.g., LLC queue (LQ) 114. From the LQ 114, the access request may be issued to the LLC 112 via interface 113, e.g., under the control of a scheduling logic, such as queue manager 130. Although embodiments of the invention are not limited in this respect, queue manager 130 may be part of the resource management mechanism in accordance with some demonstrative embodiments of the invention, as explained in detail below. For example, queue manager 130 may be implemented using specialized hardware associated with LQ 114 and may include algorithms, implemented in either hardware, software, or both, to schedule and manage the queued resource requests.

As is known in the art, requests to access a cache may be either successful (i.e. "hit") or unsuccessful (i.e. "miss") according to whether a desired data item is found in a cache. An access request that misses on access to LLC 112 may be allocated to an external bus queue (XQ) 116, e.g., via interface 115, in order to be issued to the FSB 104 via interconnect 103 and thereby to access system memory 110, as explained above. However, in some cases XQ 116 may be used to capacity and/or contain a previous entry in XQ 116 of a pending request to access the same memory address of system memory 110, thereby contributing to the latency of the rejection of the request. Although embodiments of the invention are not limited in this respect, in such a case where the rejection is dependent on an external bus, e.g., FSB 104 and/or XQ 116, the rejection may be classified as a long reject.

In other cases, an access request may be received from an external agent, e.g., a direct memory Access (DMA) agent or another processor, via FSB 104. For example, the external request may be transmitted via signal 117 and allocated as an entry in a snoop queue 118 to be issued to the LLC 112, e.g., via signal 119. A pending external request from snoop queue 118 may request access to the same area of LLC 112 as the access request issued from CPU core 101, causing a rejection of the access request when it is issued from LQ 114. Although embodiments of the invention are not limited in this respect, in such a case where the rejection is dependent on internal CPU events, the rejection may be classified as a short reject.

According to some demonstrative embodiments of the invention, when a request is allocated to the LQ 114 the resource management mechanism, e.g., queue manager 130, may check one or more conditions that may prevent the request from being serviced. For example, queue manager 130 may check the status of the XQ 116 and/or snoop queue 118. In accordance with embodiments of the invention, the resource management mechanism may monitor potential rejection conditions concurrently with the service of the request, e.g., if LQ 114 is empty and the request is sent directly to LLC 112 in the next cycle. Although embodiments of the invention are not limited in this respect, the resource management mechanism, e.g., queue manager 130, may be able to monitor the availability of resources, detect the cause of a rejection, distinguish between different types of rejections, and manage the different types accordingly, as explained in detail below.

For example, in accordance with some demonstrative embodiments of the invention, a rejected request that is classified as a short reject may be rescheduled in LQ 114 and subsequently reissued. In accordance with some demonstrative embodiments of the invention, a rejected request that is classified as a long reject may be placed in a reject queue 120. Long reject requests in reject queue 120 may be in a suspend state, as explained in detail below with reference to FIG. 3. In accordance with some demonstrative embodiments of the invention, requests may be released from the reject queue 120 upon receipt of a wake-up event, as explained in detail below with reference to FIG. 3, and returned, e.g., to the LQ to be subsequently reissued.

Although embodiments of the invention are not limited in this respect, reject queue 120 may be associated with LQ 114 and also controlled by queue manager 130. Alternatively, reject queue 120 may be controlled by a separate queue manager associated with reject queue 120 and included in the resource management mechanism in accordance with embodiments of the invention.

Figure 2:
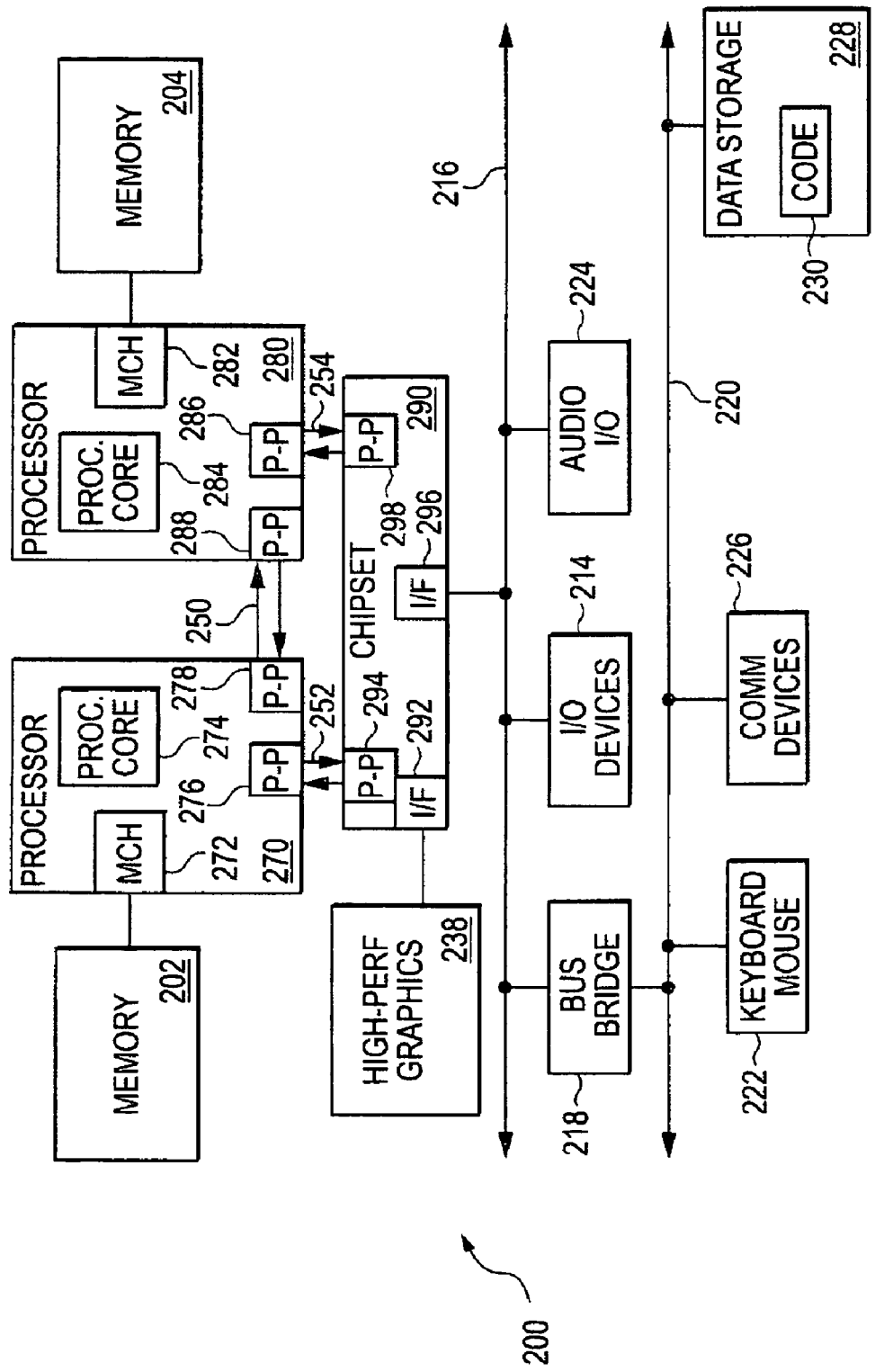
FIG. 2 is a schematic diagram of a point-to-point computing system in which one embodiment of the invention may be used.

Reference is made to FIG. 2, which schematically illustrates a point-to-point computing system 200 in which one embodiment of the invention may be used. It will be appreciated that although, for demonstrative purposes, embodiments of the invention are described above with reference to processor 102 of shared-bus computing system 100 and elements thereof, embodiments of the invention are not limited in this respect and may also be used, e.g., in one or more processors of point-to-point computing system 200, as described below.

According to some demonstrative embodiments of the invention, system 200 may include, for example, a point-to-point busing scheme having one or more processors, e.g., processors 270 and 280; memories, e.g., memories 202 and 204; and/or input/output (I/O) devices, e.g., devices 214, interconnected by one or more point-to-point interfaces. Processors 270 and/or 280 may include processor cores 274 and 284, respectively. Although embodiments of the invention are not limited in this respect, one or both of processors 270 and 280 may implement a resource management mechanism in accordance with embodiments of the invention, e.g., as described in detail above with reference to processor 102 of FIG. 1, and with reference to FIGS. 3 and 4 below.

According to some demonstrative embodiments of the invention, processors 270 and 280 may also include respective local memory channel hubs (MCH) 272 and 282, e.g. to connect with memories 202 and 204, respectively. Processors 270 and 280 may exchange data via a point-to-point interface 250, e.g., using point-to-point interface circuits 278 and 288, respectively. Processors 270 and/or 280 may exchange data with a chipset 290 via point-to-point interfaces 252 and 254, e.g., using point-to-point interface circuits 276, 294, 286, and 298. Chipset 290 may also exchange data with a high-performance graphics circuit 238 via a high-performance graphics interface 292. Chipset 290 may also exchange data with a bus 216 via a bus interface 296. Input/output devices 214 may include, according to some embodiments, low performance graphics controllers, video controllers, and/or networking controllers, e.g., as are known in the art. System 200 may also include, according to some demonstrative embodiments, another bus bridge 218, which may be used, for example, to permit data exchanges between bus 216 and a bus 220. Bus 220 may in some embodiments be a small computer system interface (SCSI) bus, an integrated drive electronics (IDE) bus, or a universal serial bus (USB) bus, e.g., as are known in the art. Additional I/O devices may be connected to bus 220. For example, system 200 may also include, keyboard and/or a cursor control devices 222, e.g., a mouse; an audio I/O 224; communications devices 226, e.g., including modems and/or network interfaces; and/or data storage devices 228, e.g., to store software code 230. In some embodiments, data storage devices 228 may include a fixed magnetic disk, a floppy disk drive, an optical disk drive, a magneto-optical disk drive, a magnetic tape, or non-volatile memory including flash memory.

Figure 3:
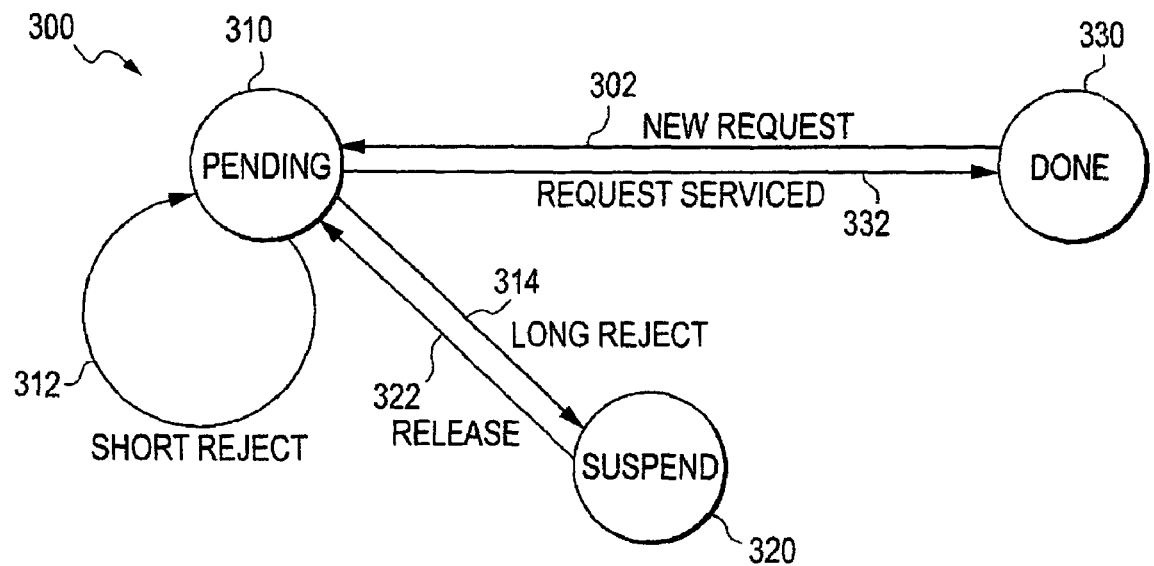
FIG. 3 is a schematic state diagram of request states in accordance with some demonstrative embodiments of the invention.

Reference is made to FIG. 3, which schematically illustrates a state diagram 300 of possible request states in accordance with some demonstrative embodiments of the invention. As is known in the art, a state diagram may be used to graphically represent a finite state machine, e.g., a deterministic finite state machine (DFA), nondeterministic finite state machine (NFA), generalized nondeterministic finite state machine (GNFA), or Moore machine. For example, each vertex may represent a state and each edge may represent a transition between two states. An input condition to the state may be signified on the edge. Although embodiments of the invention are not limited in this respect, a resource request, e.g., from processor 102 to memory unit 104 of computing system 100, or to a resource associated with memory 104 or from processor core 101 to the LLC 112, may be in a "pending" state 310, a "suspend" state 320, or a "done" state 330.

According to some demonstrative embodiments of the invention, a new resource request may be produced, e.g., by CPU 102, and may initially be at a pending state 310, as indicated at transition 302. For example, a request in the LLC queue 114 may be in pending state 310. If service of the request is completed successfully, the request may change from pending state 310 to done state 330, as indicated at transition 332. For example, the request may be issued from the LQ 114 to the LLC 112 and serviced immediately if there is a hit and no contention. Alternately, a request in pending state 310 may be rejected, e.g., due to resource contention or if the external bus queue 116 is full or front side bus 104 is used to capacity.

According to some demonstrative embodiments of the invention, the resource management mechanism, e.g., queue manager 130 may be able to classify rejected requests, for example, as either a "long reject" or a "short reject" based on the cause of the rejection and the amount of time the rejection conditions are expected to remain valid.

According to some demonstrative embodiments of the invention, a rejected request classified as a short reject may be posted again to the request queue wherein the request is reissued repeatedly, e.g., via rescheduling in LQ 114, until the requested resource is available and the request is serviced. Thus, as indicated at transition 312, a request may exit and re-enter pending state 310 without transitioning through another state. Although the invention is not limited in this respect, the resource that caused the short reject may be unavailable for only a relatively short time, e.g., a single cycle, such as in the case of a bank conflict occurs within LLC 112, as is known in the art.

According to some demonstrative embodiments of the invention, a rejected request classified as a long reject may change from pending state 310 to suspend state 320, as indicated at transition 314. As indicated at transition 322, a request may exit suspend state 320 and resume pending state 310 when the cause of the rejection is no longer in force, e.g., when a locked resource is released. For example, if a memory transaction needs to access the main memory 110 in order to be served, it may take, e.g., hundreds of cycles before it could be completed and data written to the cache. In such a case, the bus used in the memory transaction, e.g., FSB 104, may send an indication that data was received from the system memory 110 to the LLC 112, which may indicate the transaction is completed.

Although embodiments of the invention are not limited in this respect, in the event of a long reject the request may be stored in a reject queue, e.g., reject queue 120, until the locked resource is released. Alternatively, a request may be associated with a suspend status in the LLC queue 114, which may prevent the suspended request from being issued to the LLC 112. Since the resource is expected to remain locked for a relatively long time compared to a short reject, for example, hundreds of cycles in the case of, e.g., main memory access of locked data in another cache, suspending a request classified as a long reject may prevent unnecessary resending of the request while the resource remains unavailable. Thus, in accordance with some demonstrative embodiments of the invention, use of a reject queue and/or a suspend state may improve performance efficiency.

Figure 4:
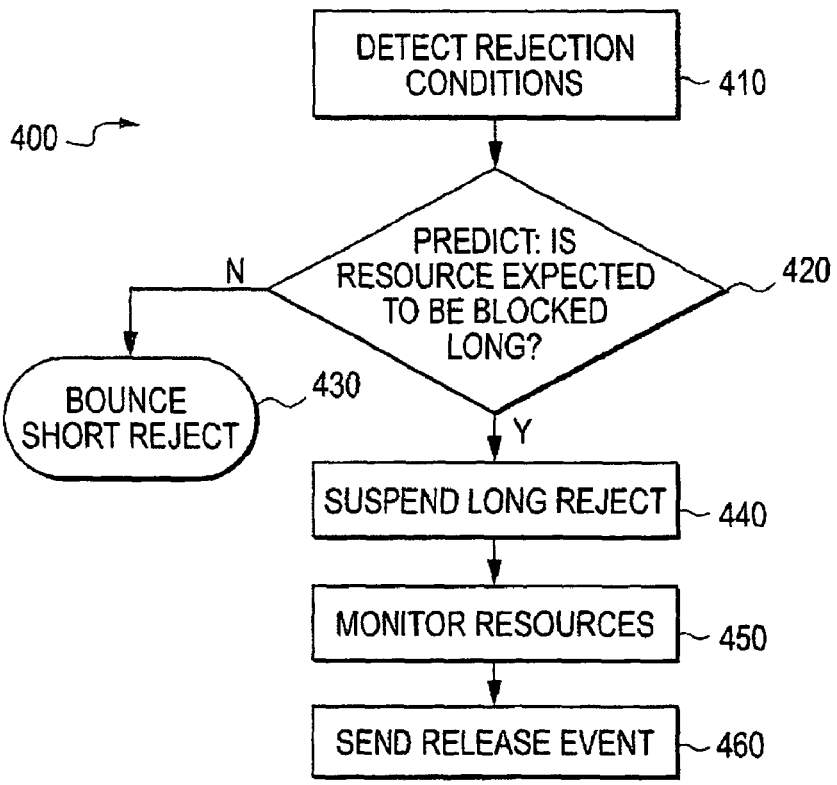
FIG. 4 is a schematic flowchart of a method of managing rejected requests in accordance with some demonstrative embodiments of the invention.

Reference is made to FIG. 4, which schematically illustrates a flowchart of a method 300 of managing rejected requests in accordance with some demonstrative embodiments of the invention. Although the invention is not limited in this respect, method 300 may be executed by a resource manager, for example, queue manager 130.

According to some demonstrative embodiments of the invention, method 400 may begin by detecting the cause of a rejection, as indicated at block 410. For example, conditions that may cause a rejection may be checked in parallel to an access of the last level cache. As indicated at block 420, method 400 may include distinguishing between different rejection types, for example, a long reject and a short reject, based on predefined parameters, for example, the amount of time a requested resource is expected to remain locked. Although embodiments of the invention are not limited in this respect, method 400 may include a heuristic to predict whether a rejection is a long reject or a short reject. For example, a rejection that may depend on an external resource, e.g., FSB 104 and/or XQ 116, may be classified as long and a rejection that may depend on an internal CPU event, e.g., LLC 112, may be classified as short. As indicated at block 430, the method may include bouncing a request classified as a short reject, e.g., via rescheduling in the appropriate queue.

According to some demonstrative embodiments of the invention, method 400 may include suspending a long reject request, as indicated at block 440. For example, a long reject request may be placed in a reject queue, e.g., queue 120. Although embodiments of the invention are not limited in this respect, a suspended request may be associated with data regarding the cause of the rejection, e.g., data indicating which resource is locked.

According to some demonstrative embodiments of the invention, method 400 may include monitoring resources, as indicated at block 450. For example, the resource manager may query a requested resource of computing system 100, e.g., periodically, to determine whether the resource remains locked. Additionally or alternatively, the resource manager may wait for implicit or explicit signals from the locked resource that the locking condition was released, e.g., FSB 104 and/or XQ 116 may send an indication that data was received, e.g., from the system memory 110 to the LLC 112. Such an indication may generally indicate that a memory transaction is completed. However, it will be appreciated that since more than one suspended request may be dependent on such a memory transaction, the general indication may not apply to all of the suspended requests.

According to some demonstrative embodiments of the invention, method 400 may include sending a release command to the reject queue, as indicated at block 460. Although the invention is not limited in this respect, a release command may trigger release of one or more long reject requests from the queue. For example, a release command may trigger a specific release event to release a particular request from the queue, a general release event to release all queued requests, or a group release event to release a group of requests from the queue having similar parameters.

According to some demonstrative embodiments of the invention, a general release event may be triggered by a change in at least one long reject condition. For example, if the XQ 116 is full, then the freeing of an empty entry in the queue may signal a general release. Suspended requests, e.g., in reject queue 120 may be reissued, e.g., to LLC 114. In the case of a general release, some requests may be rejected again, e.g., due to ongoing contention, while at least one request that misses the LLC may be able to enter the XQ to be serviced. If a released request is rejected, it may be returned to the suspend state, e.g., in reject queue 120.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A computerized method comprising:
    monitoring one or more rejection conditions for a request to access a resource;
    classifying a rejection of the request as either a long reject or a short reject based one or more parameters relating to the one or more rejection conditions, wherein classifying a rejection comprises classifying a rejection as a short reject if said one or more rejection conditions include conditions dependent on an internal event and classifying a rejection as a long reject if said one or more rejection conditions include conditions dependent on an external resource;
    suspending said request in a reject queue if the request is rejected and classified as a long reject, wherein data relating to the cause of the rejection and the resource to be accessed by said request is to be associated with the request in the reject queue; and
    rescheduling said request in a service queue, associated with said resource, to be accessed if the request is rejected and classified as a short reject.

2. The method of claim 1, wherein classifying a rejection of said request based on said one or more parameters comprises classifying based on a cause of the rejection and the amount of time said one or more rejection conditions are expected to remain valid.

3. The method of claim 1, wherein classifying a rejection comprises predicting the amount of time said one or more rejection conditions are expected to remain valid based on the cause of the rejection.

4. The method of claim 1, wherein monitoring said one or more rejection conditions comprises querying one or more resources to determine availability of said one or more resources.

5. The method of claim 1, comprising sending a release event to release said request from said reject queue based on said data and a signal from the resource to be accessed indicating that the resource is available to service the request.

6. The method of claim 1, comprising sending a release event to release said request from said reject queue based on one or more parameters indicative of a change in said one or more rejection conditions.

7. An apparatus comprising:
    a resource management hardware mechanism to monitor one or more rejection conditions for a request to access a resource and to classify a rejection of the request as either a long reject or a short reject based one or more parameters relating to the one or more rejection conditions, wherein a rejection is to be classified as a short reject if said one or more rejection conditions include conditions dependent on an internal event and to be classified as a long reject if said one or more rejection conditions include conditions dependent on an external resource, wherein said request is to be suspended in a reject queue if the request is rejected and classified as a long reject, wherein data relating to the cause of the rejection and the resource to be accessed by said request is to be associated with the request in the reject queue and wherein said request is to be rescheduled in a service queue, associated with said resource, to be accessed if the request is rejected and classified as a short reject.

8. The apparatus of claim 7, wherein said resource management mechanism is to classify a rejection based on a cause of the rejection and the amount of time said one or more rejection conditions are expected to remain valid.

9. The apparatus of claim 7, wherein said resource management mechanism is to predict the amount of time said one or more rejection conditions are expected to remain valid based on the cause of the rejection.

10. The apparatus of claim 7, wherein said resource management mechanism is to query one or more resources to determine availability of said one or more resources.

11. The apparatus of claim 7, wherein said resource management mechanism is to associate with said request that is suspended data relating to the cause of the rejection and the resource to be accessed by said request.

12. The apparatus of claim 11, wherein said resource management mechanism is to release said request that is suspended based on said data and a signal from the resource to be accessed indicating that the resource is available to service the request.

13. The apparatus of claim 7, wherein said resource management mechanism is to release said request that is suspended based on one or more parameters indicative of a change in said one or more rejection conditions.

14. A system comprising:

a processor to monitor one or more rejection conditions for a request to access a resource and to classify a rejection of the request as either a long reject or a short reject based one or more parameters relating to the one or more rejection conditions, wherein a rejection is to be classified as a short reject if said one or more rejection conditions include conditions dependent on an internal event and to be classified as a long reject if said one or more rejection conditions include conditions dependent on an external resource; and a memory to store one or more queues for management of the request according to whether the request is classified as a long reject or a short reject, wherein said request is to be suspended in a reject queue if the request is rejected and classified as a long reject, wherein data relating to the cause of the rejection and the resource to be accessed by said request is to be associated with the request in the reject queue and wherein said request is to be rescheduled in a service queue, associated with said resource, to be accessed if the request is rejected and classified as a short reject.

15. The system of claim 14, wherein said processor is to associate with said request in the reject queue data relating to the cause of the rejection and the resource to be accessed by the request, and wherein said memory is to store the data associated with the request.

16. The system of claim 15, wherein said processor is to release said request from the reject queue based on one or more parameters indicative of a change in said one or more rejection conditions.

17. The system of claim 15, wherein said processor is to release said request from the reject queue based on said data and a signal from the resource to be accessed indicating that the resource is available to service the request.

18. The system of claim 14, wherein said processor is to query one or more resources to determine availability of said one or more resources.

19. The system of claim 14, wherein said processor is to classify a rejection based on a cause of the rejection and the amount of time said one or more rejection conditions are expected to remain valid.

20. The system of claim 14, wherein said processor is to predict the amount of time said one or more rejection conditions are expected to remain valid based on the cause of the rejection.

* * * * *